May 18, 1926.  
R. B. OTWELL  
MOWING ATTACHMENT FOR TRACTORS  
Filed July 23, 1925   3 Sheets-Sheet 3  
1,584,798
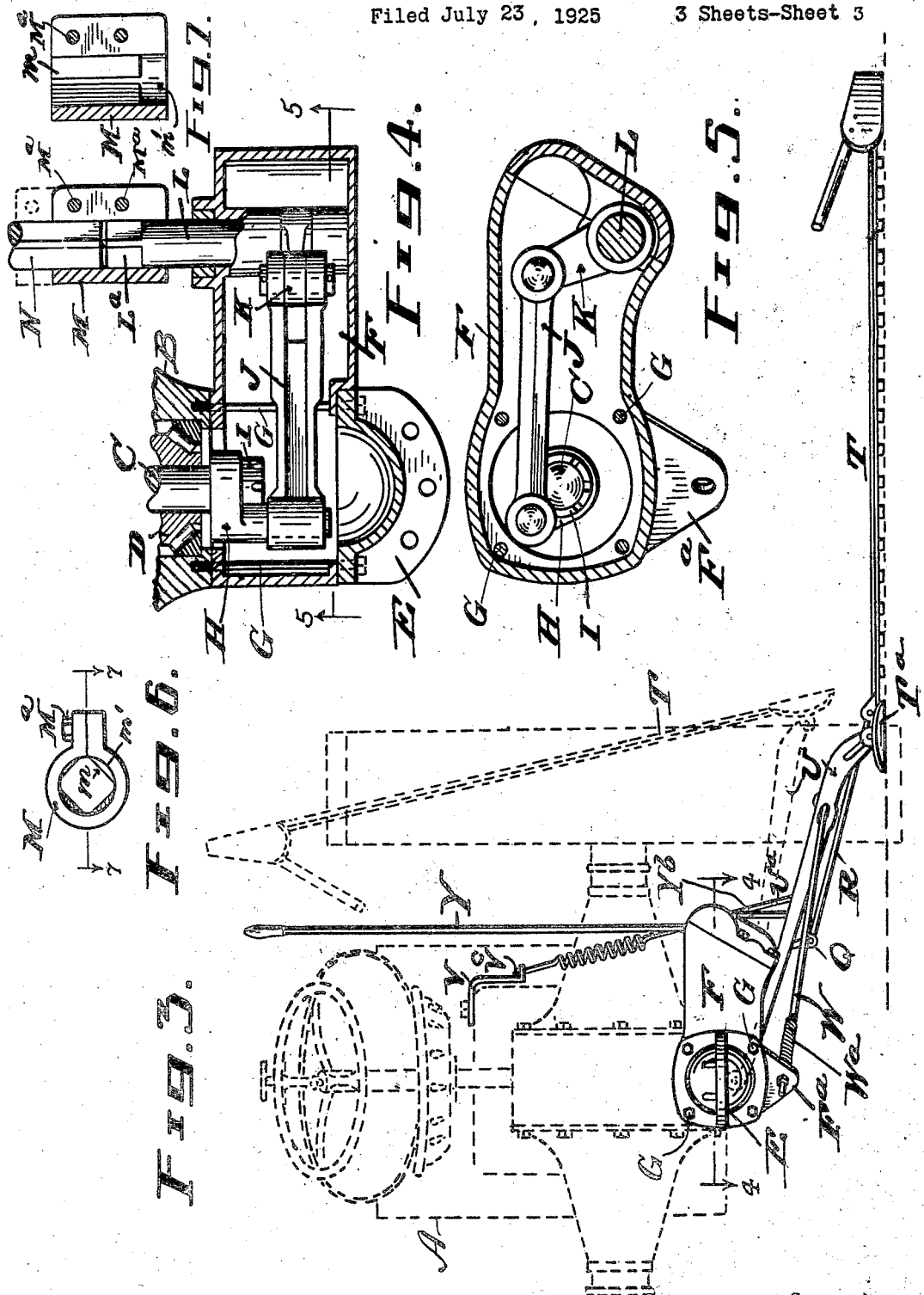
Inventor  
Ralph B. Otwell  
BY  
Attorney Patented May 18, 1926.

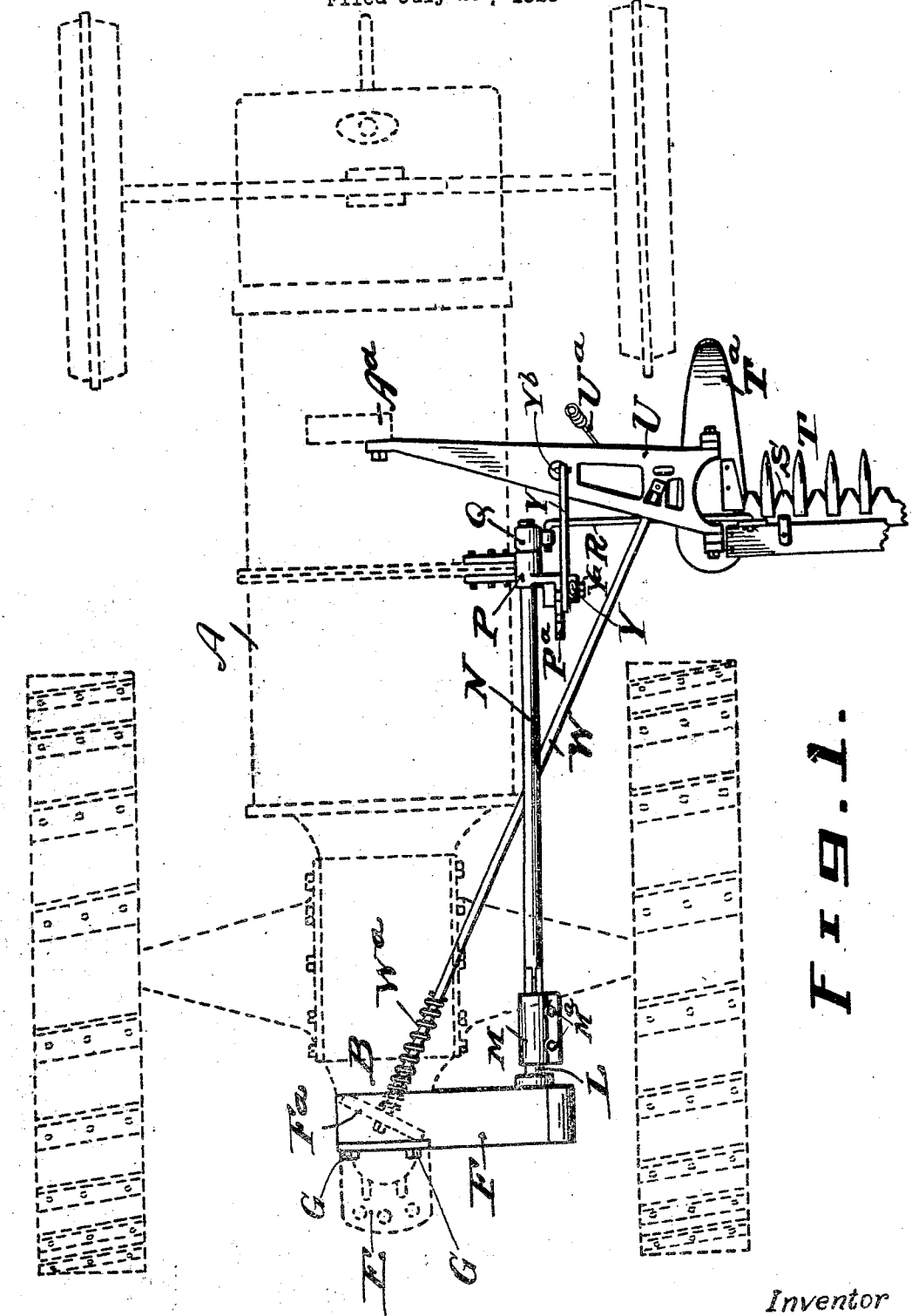

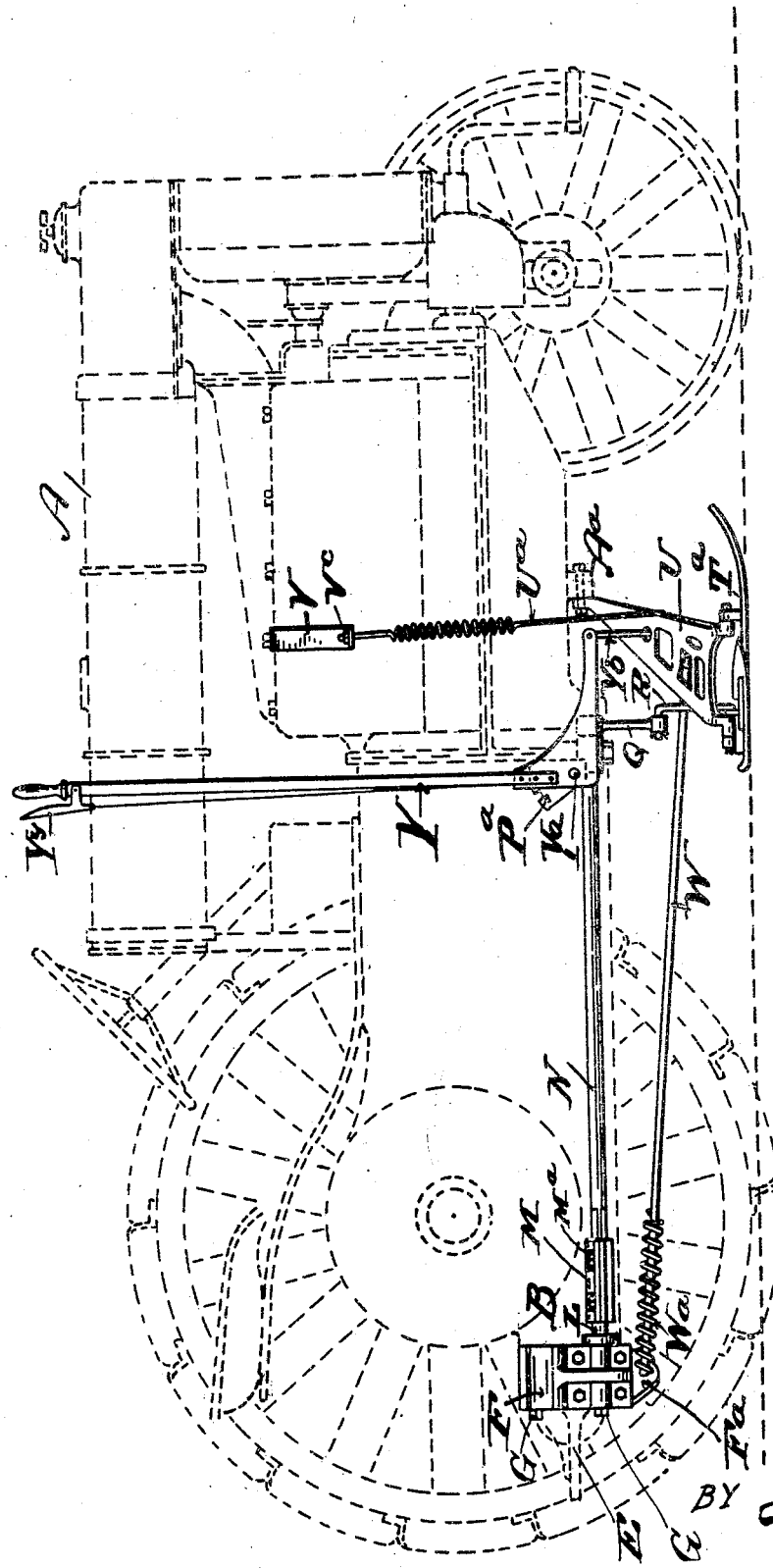

1,584,798

UNITED STATES PATENT OFFICE.

RALPH B. OTWELL, OF DETROIT, MICHIGAN, ASSIGNOR TO DETROIT HARVESTER COMPANY, OF DETROIT, MICHIGAN, A CORPORATION OF MICHIGAN.

MOWING ATTACHMENT FOR TRACTORS.

Application filed July 23, 1925. Serial No. 45,676.

My invention relates to a mowing attachment for tractors, shown in the accompanying drawings and more particularly described in the following specification and claims.

The primary object of the present invention is to provide a simple and inexpensive mowing attachment for tractors—the construction cost of which is materially less than that of the devices shown and described in my former Patents No. 1,443,161, dated January 30, 1923, and No. 1,518,161, dated January 9, 1924, while the simplicity of operation is even greater.

A further object of the present invention is to provide a device which may be quickly installed and removed from the tractor without altering the construction of the latter.

With this and other objects in view a unit is interposed between the end of the transmission case and the draw bar cap of the tractor, which comprises a housing—enclosing a crank arm to be secured to the end of the worm shaft of the tractor—a rocker arm mounted on a stub shaft having a squared end projecting beyond the wall of the housing—its outer end being fitted with a slidable divided sleeve, and a pitman rod connecting the crank and rocker arms in operative relation. To install this unit the draw bar cap is first removed from the end of the transmission case together with its four retaining bolts, the latter being replaced by four relatively longer bolts designed to extend through the draw bar cap—the housing for the crank and rocker arms and into the wall of the transmission case of the tractor—these several parts may remain permanently attached to the tractor as the operation of the latter will not be affected thereby when the mowing unit is disconnected from the tractor.

It will thus be seen that a further object of the present invention is to minimize the labor and time required to install or remove the mowing attachment.

A rock shaft for actuating the cutter bar of the mowing unit is either coupled or released from driving relation with the stub shaft by shifting a divided sleeve slidable upon the abutting ends of the respective shafts that it may be engaged or disconnected from the squared portions of the shaft—in order that a driving connection or not may be obtained between the shafts as required.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a plan view of the mowing unit attached to a tractor, indicated in dotted lines—a fragment of the cutter bar only being shown.

Figure 2 is a side elevation of the device attached to the tractor—indicated in dotted lines.

Figure 3 is a rear elevation of the device attached to the tractor shown in dotted lines—the draw bar cap of the tractor however being indicated in full lines.

Figure 4 is a horizontal sectional view taken on or about line 4—4 of Figure 3 showing a fragment of the tractor transmission case.

Figure 5 is a vertical cross-sectional view through the housing for the crank and rocker arm and connecting pitman—taken on or about line 5—5 of Figure 4.

Figure 6 is an end elevation of the coupling sleeve connecting the stub shaft of the rocker arm with the rock shaft for actuating the cutter bar.

Figure 7 is a cross-sectional view through the coupling sleeve, taken on or about line 7—7 of Figure 6.

Referring now to the letters of reference placed upon the drawings:

A denotes a tractor: B its transmission housing: C the usual worm transmission shaft and D the rear thrust bearing for the shaft supported in the end of the transmission housing.

E indicates the draw bar plate ordinarily attached directly to the transmission housing but in the present embodiment a housing F is interposed between it and the transmission housing—the parts being secured to the transmisison housing by a plurality of relatively longer bolts G in place of those usually employed.

The housing F encloses a crank arm H screwed or otherwise secured on the end of the worm transmission shaft.

I represents a nut on the end of the shaft to further secure the crank arm in position.

J designates a pitman connecting the crank arm H with a rocker arm K, mounted on a stub shaft L, journalled in the housing F between the draw bar cap and transmission case or housing.

The stub shaft L extends through the wall of the housing and is squared at its outer end as indicated at $L^a$ to receive a slidable divided sleeve M adapted to embrace the shaft and to couple the same with a rock shaft N—which is also provided with a squared end.

The socket in the slidable sleeve is squared—see $m$, Figure 7—for a portion of its length to conform to the squared or rectangular ends of the stub and rock shafts that a driving connection between the two shafts may be had when the bolts $M^a$ connecting the divided portion of the sleeve are adjusted to cause the squared socket of the sleeve to grip the squared ends of the shafts. The remaining portion of the socket however is circular in cross section—as indicated at $m^1$—so that when the sleeve is slidably adjusted upon the aligned shafts, as indicated in dotted lines in Figure 4, the circular portion of the socket will register with the squared portion $L^a$ of the stub shaft permitting the latter to turn in the socket thus releasing the rock shaft N from operative connection with the stub shaft.

The rock shaft N is journalled at its forward end in a bearing P bolted to flanges joining the transmission housing and crank case. At the end of the shaft N is a rocker arm Q connected by a link R to the cutter bar S of a harvester unit T of usual construction.

Pivotally connected with the shoe $T^a$ of the harvester unit is a bracket arm U in turn pivoted to a lug $A^a$ depending from the underside of the body of the tractor. $U^a$ denotes a rod connected with the bracket arm U having a spring intermediate of its ends—the upper end of the rod extending through the arm of a bracket fixture V, bolted to the body of the tractor. A nut $V^c$ is screwed upon the end of the rod for adjusting the tension of the spring—the purpose of the rod and spring being to yieldingly support and counterbalance the weight of the bracket arm and other connecting parts.

W indicates a rod connected at one end with the bracket arm U supporting the mower—and extending therefrom at an angle to a lug $F^a$ (through which it is free to move) projecting from the underside of the housing F.

The rod W is fitted with a spring $W^a$ secured thereto, which bearing against the lug $F^a$ provides a yieldable connection between the parts and thus relieves the cutter bar of shocks occasioned by the latter encountering stones or other obstructions.

The point of intersection between the rod W and the lug $F^a$, and the pivotal connection between the bracket arm U and the lug $A^a$ is in line with the longitudinal axis of the tractor and co-incident with its center of oscillation—the rod W and bracket arm U thus communicate all drafts to the medial longitudinal axis of the tractor and are adjustable to carry the mowing unit in any desired position.

Y represents a manually operated bell crank lever pivoted at $Y^a$ to a sector $P^a$ forming an integral part of the bearing P—the lever Y is provided with the usual spring actuated dog—not shown—for engaging the notches of the sector and a handle $Y^y$ connected therewith for releasing the dog.

$Y^b$ indicates a link connecting the bell-crank lever with the bracket arm U, whereby upon manually actuating the lever Y the cutter unit may be raised to ride over stones or other like obstructions.

To tilt the mowing unit to the position shown in dotted lines in Figure 3, the bolts $M^a$ connecting the divided portions of the sleeve M are first released, the sleeve being now free to slide upon the shafts it is shifted—as indicated in dotted lines in Figure 4—so that the circular portion of the sleeve socket may register with the squared end of the stub shaft—the object being to permit the squared end of the stub shaft to rotate freely within the circular portion of the sleeve socket—the rock shaft being released from driving connection with the stub shaft When it is desired to remove the mowing unit from the tractor the bolts $M^a$ which force the sleeve M to grip the squared ends of the shafts L and N are released—the bearing P for the shaft N is then detached from the tractor body and the pivotal bolt connecting the bracket arm U with the lug $A^a$ removed—the mowing unit having been thus detached from the tractor, the latter may be employed for other purposes, it being unnecessary to remove or disconnect the housing F from the tractor.

To operate the mower the tractor motor is started in the usual manner whereupon the crank arm H attached to the worm shaft C actuates the rocker arm K carried by the stub shaft L, which coupled to the rock shaft N reciprocates the cutter bar of the mowing unit.

I wish to particularly stress the fact that the crank arm attached to the worm shaft of the tractor is the only rotating element employed and also that its entire radial load is carried by the bearings of the worm shaft alone. All other driving parts employed either reciprocate or are of the rocking type, thus greatly simplifying the construction and operation of the device.

Having thus described my invention what I claim is:

1. In combination with a tractor including its drive shaft and transmission housing; a crank arm secured to the drive shaft; a housing for the crank arm bolted to the transmission housing; a rock shaft; a pitman connecting said rock shaft with the crank arm; a mowing unit including a cutter bar; and means connecting the rock shaft with the cutter bar for reciprocating the latter.

2. In combination with a tractor including its worm drive shaft and transmission housing; a crank arm secured to the worm driving shaft; a housing for the crank arm bolted to the transmission housing; a rock shaft journalled in the crank arm housing; a pitman connecting the rock shaft with the crank arm; a detachable mowing unit including a cutter bar; and means connecting the rock shaft with the cutter bar, whereby the cutter bar may be reciprocated.

3. In combination with a tractor including its worm drive shaft, transmission housing and draw bar cap; a crank arm secured to the drive shaft; a housing for the crank arm interposed between the transmission housing and draw bar cap; a rock shaft journalled in the crank arm housing; a pitman connecting said rock shaft with the crank arm; a mowing unit including a cutter bar; means pivoted to the tractor and to the mowing unit for supporting the latter; a thrust bar connected to said last named means extending rearwardly from the latter loosely through a lug depending from the crank case housing; a spring carried by said bar adapted to bear against said lug, whereby shocks due to the cutter bar encountering obstructions may be absorbed by the spring and a manually operated bell crank lever adapted to raise said mowing unit.

4. In combination with a tractor including its worm drive shaft and transmission housing; a crank arm secured to the worm drive shaft; a housing for the crank shaft bolted to the transmission housing; a stub shaft journalled in the crank case housing fitted with a rocker arm and having a squared end projecting beyond the wall of the latter; a pitman connecting the rocker arm with the crank arm; a rock shaft journalled in alignment with the stub shaft, its abutting end squared to conform to the squared end of the stub shaft; adjustable means for coupling said shafts together in operative relation; a mowing unit; means for supporting said mowing unit from the tractor body; and means connecting the rock shaft with the cutter bar of the mowing unit, whereby the latter may be reciprocated.

5. In combination with a tractor including its worm drive shaft and transmission housing; a crank arm secured to the worm drive shaft; a housing for the crank shaft bolted to the transmission housing; a stub shaft journalled in the crank case housing fitted with a rocker arm and having a squared end projecting beyond the wall of the latter; a pitman connecting the rocker arm with the crank arm; a rock shaft journalled in alignment with the stub shaft, its abutting end squared to conform to the squared end of the stub shaft; a divided sleeve having a socket squared for a portion of its length adapted to couple the squared ends of the rock and stub shafts together, the remaining portion of said socket being circular in cross-section, whereby upon shifting the sleeve the shafts may be released from driving connection; bolts extending through the divided portion of the sleeve adapted when adjusted to cause the sleeve to grip the ends of the respective shafts; a mowing unit; means for supporting said mowing unit from the tractor body; and means connecting the rock shaft with the cutter bar of the mowing unit, whereby the latter may be reciprocated.

6. In combination with a tractor including its worm drive shaft and transmission housing; a crank arm secured to the drive shaft; a housing for the crank arm bolted to the transmission housing; a rock shaft; a pitman connecting said rock shaft with the crank arm; a mowing unit, supporting means for the mowing unit pivoted to the latter and to the tractor along substantially the medial longitudinal plane of the tractor; a bar fitted with a spring connected with said supporting means and adjustably connected to a bracket secured to the body of the tractor, whereby the weight of the mower unit may be counterbalanced in a measure; a thrust bar connected with said supporting unit extending rearwardly and loosely through a lug depending from the crank housing; a spring fitted on said rod adapted to bear upon said lug, whereby shocks resulting from the cutter bar contacting with obstructions are absorbed, and means for manually raising the mowing unit.

7. In combination with a tractor including its worm shaft and transmission housing; a crank arm secured to the worm shaft of the tractor; a housing for the crank arm bolted to the transmission housing; a rock shaft; a pitman connecting the rock shaft with the crank arm; a mower unit including a cutter bar; means for operably connecting the cutter bar with the rock shaft; a supporting arm pivoted to the mower unit and to the tractor along substantially the medial longitudinal vertical plane thereof, a rod secured to said supporting arm and to a fixture secured to the tractor; a spring connected with the rod adapted to yieldingly support and substantially counterbalance the weight of the arm; a thrust bar connected with the arm extending rearwardly at an angle through a depending leg disposed along substantially the medial longitudinal vertical plane of the tractor; a spring sleeved upon the bar adapted to bear against the depending lug; and a manually operated lever for raising or lowering said supporting arm and mower unit.

In testimony whereof, I sign this specification.

RALPH B. OTWELL.